(12) United States Patent
Schneider

(10) Patent No.: US 8,452,005 B2
(45) Date of Patent: *May 28, 2013

(54) UNICODE-COMPATIBLE ENCIPHERMENT

(75) Inventor: James Paul Schneider, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 270 days.

This patent is subject to a terminal disclaimer.

(21) Appl. No.: 12/628,099

(22) Filed: Nov. 30, 2009

(65) Prior Publication Data

US 2011/0129083 A1  Jun. 2, 2011

(51) Int. Cl.
*H04L 9/28* (2006.01)

(52) U.S. Cl.
USPC .............................. 380/28; 380/287

(58) Field of Classification Search
None
See application file for complete search history.

(56) References Cited

U.S. PATENT DOCUMENTS

| | | | |
|---|---|---|---|
| 6,266,455 B1* | 7/2001 | Kobayashi | 382/307 |
| 6,999,082 B2* | 2/2006 | Nishimura | 345/467 |
| 2010/0185862 A1* | 7/2010 | Moore et al. | 713/171 |
| 2011/0055864 A1* | 3/2011 | Shah et al. | 725/31 |

* cited by examiner

*Primary Examiner* — Fikremariam A Yalew

(74) *Attorney, Agent, or Firm* — Lowenstein Sandler LLP

(57) ABSTRACT

Unicode character data is received for transcoding. The Unicode character data is transcoded to an intermediate value. The intermediate value is enciphered. The enciphered intermediate value is transcoded back to Unicode-compatible character data. The transcoding includes assembling character values from the Unicode character data into one or more blocks and representing the assembled character values in a compact form.

20 Claims, 5 Drawing Sheets

UNICODE-COMPATIBLE ENCIPHERMENT

TECHNICAL FIELD

Embodiments of the present invention relate to computing systems, and more particularly, to implementation of character data in different computer languages.

BACKGROUND

There is a mismatch between the way C (the implementation language of Apache HTTPD) and JavaScript handle character data. Within C, characters are represented as arrays of small integer values (typically, 8 bits, although 16 bits per character is also possible). C relies upon the standard library to provide interpretation and rendering. Within C itself, it is just binary data.

JavaScript, on the other hand, treats characters within a string as atomic entities. In particular, JavaScript will not compose character values from encodings. So, if one has a Unicode Transformation Format (UTF)-8 encoding of characters outside the range from 0-127, and he/she is not careful to handle the encoding/decoding correctly, JavaScript programs may generate strings with inappropriate encodings. For example, the character "π" corresponds to the code point U+3C0. In UTF-8, this is 0xcf, 0x80. A string containing the character "π" can be constructed by passing the value 0x3c0 to the String.fromCharCode( ) method, but passing the bytes 0xcf, 0x80 will result in a two character string Ï <pad> (the second character is actually a control character).

This is a problem in the context of cryptography, because most cryptographic algorithms operate on binary data without regard to character encodings, and rely on the external system to manage character data appropriately. This external management does not exist in JavaScript.

BRIEF DESCRIPTION OF THE DRAWINGS

The present invention is illustrated by way of example, and not by way of limitation, in the figures of the accompanying drawings and in which.

DETAILED DESCRIPTION

Described herein is a method and apparatus for transcoding Unicode character data. The Unicode character data is transcoded to an intermediate value. The intermediate value is enciphered. The enciphered intermediate value is transcoded back to Unicode-compatible character data for transport/external processing. The transcoding includes assembling character values from the Unicode character data into one or more blocks and representing the assembled character values in a compact form. At the receiving end, the steps are taken in reverse.

Unicode is a mostly complete attempt at a universal character set. For most modern phoneme-based scripts (such as Latin or Cyrillic), all of the required characters in the script are in the first 55,296 characters. Indeed, for most languages, the number of characters used is a small fraction of the total range of Unicode characters.

Figure 1:
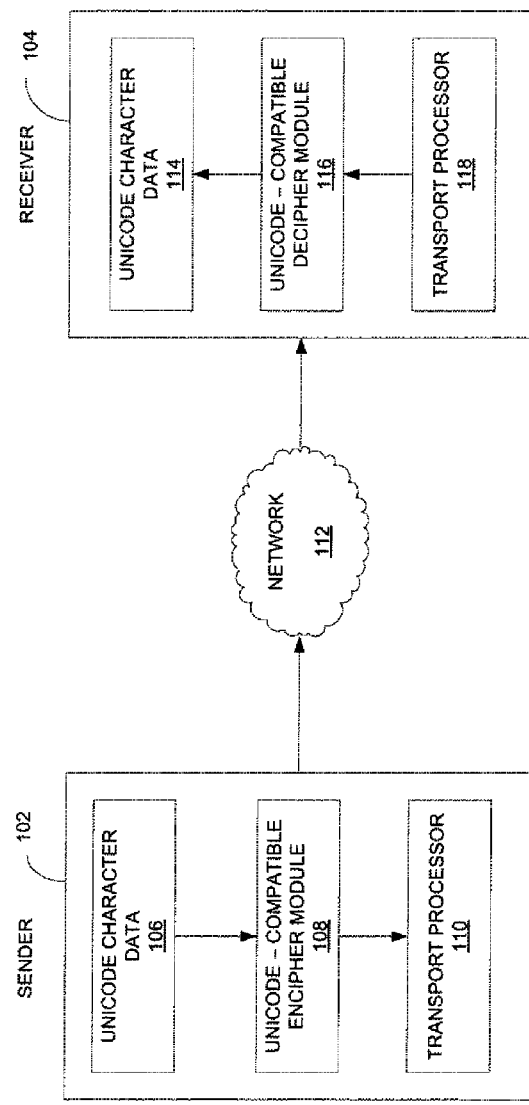
FIG. 1 is a block diagram illustrating a system liar a unicode-compatible encipherment between a sender and a receiver.

To take advantage of this restricted range effect, the input is transcoded into a form that is convenient for encipherment purposes. In one embodiment, the transcoding of character data is for JavaScript. FIG. 1 is a block diagram illustrating a system for a unicode-compatible encipherment between a sender 102 and a receiver 104 through a computer network 112. In one embodiment, sender 102 includes a Unicode character data module 106, a Unicode-compatible encipher module 108, and a transport processor module 110. In one embodiment, receiver 104 includes a Unicode Character data module 112, a Unicode-compatible decipher module 116, and a transport processor module 118.

Unicode character module 106 generates and stores Unicode character data for transcoding. Unicode character module 106 can also receive or obtain Unicode character data from an external source, such as a secondary storage device, a network, device, or a program or system library. Unicode-compatible encipher module 108 transcodes the Unicode character data for transport/external processing performed by transport processor module 110. The operation of these modules is discussed in more detail below.

Transport processor 118 receives the Unicode character data from sender 102 and decipher it using a Unicode-compatible decipher module 116. Unicode character data storage 114 receives and stores the deciphered Unicode character data from Unicode-compatible decipher module 116. The operation of these modules is discussed in more detail below.

Figure 2:
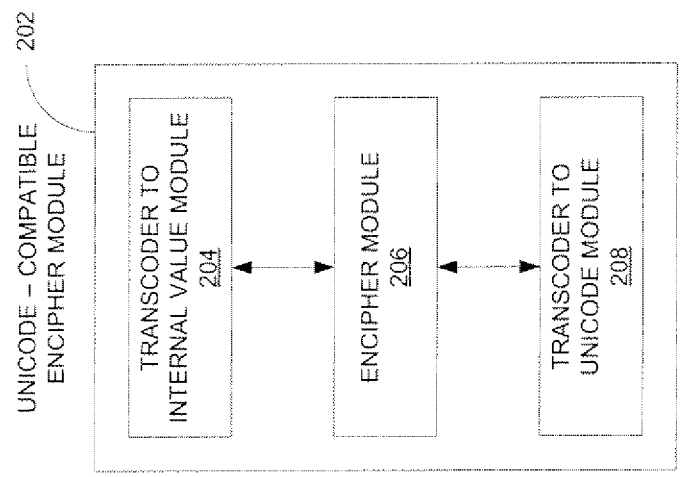
FIG. 2 is a block diagram illustrating one embodiment of a unicode-compatible encipherment module.

FIG. 2 is a block diagram illustrating one embodiment of a Unicode-compatible encipherment module 200 of a sender. Unicode-compatible encipherment module 200 includes a transcoder to an intermediate value module 202, an encipher module 204, and a transcoder to Unicode module 206. Transcoder 202 is configured to assemble several character values into one or more blocks, and represents them in a compact fashion. In one embodiment, the representation internally can include a count of characters, a low code point value, an encoded value to represent the range, and then a series of offset values from the low code point value. The encoding process attempts to pack as many characters as possible into one or a few blocks.

For illustration purposes, consider the string "abracadabra", to be packed into one or more 128 bit blocks. The Unicode code points for this string are:

a: U+0061
b: U+0062
c: U+0063
d: U+0064
r: U+0072

So, coding this string would require representing 11 (the number of characters in the string), U+0061 (the lowest character value to be encoded), 17 (the difference between the lowest and highest character value and the sequence 0, 1, 17, 0, 2, 0, 3, 0, 1, 17, 0.

For simplicity, the lowest character value can be represented as a 21 bit integer. Alternately, it can be represented as itself in either UTF-8 or UTF-16, at the cost of a small amount of complexity. Rather than encode the actual difference between the highest and lowest character codes, an encoding of the number of bits required for the difference would suffice. In this instance, it would be a representation of the number 5. Since the character set spans fewer than 21 bits, the required representation would take 5 bits.

For the example above, this gives the following as the first 26 bits of the block: 0000 0000 0000 0011 0000 1001 01

This leaves 102 bits within the block, or enough room for 19 characters (if the number of characters is coded within the block). With a maximum of 19 characters, the number of characters can be coded with 5 bits. The characters themselves would follow sequentially. This adds 60 bits to the block so far. The remaining 42 bits could be filled with random data.

In another embodiment, as an alternative to explicitly encoding the number of characters within a block, a delimiter can be coded at the end of the data. The delimiter could be the offset value with all hits set. So, for this example, instead of coding 11, 0, 1, 17, 0, 2, 0, 3, 0, 1, 17, 0, we'd code 0, 1, 17, 0, 2, 0, 3, 0, 1, 17, 0, 31. The only time this would use more bits than the previous encoding would be the case where the appropriate offset value is one less than a power of two—in this case, all of the entries would need to be one hit larger.

For example, the string "padding" would result in offsets of 15, 0, 3, 3, 8, 13, 6. Ordinarily, these offsets would require four bits each. However, to use a delimiter, the offsets would need to be five bits each.

While a delimiter will potentially increase the number of bits required to represent a string, it has an advantage over coding a character count—the number of characters to be coded doesn't need to be known in advance. A delimiter also makes it easier to span multiple blocks with a string.

Once the one or more blocks are packed, encipher module 204 enciphers the blocks using a convenient algorithm and mode (such as Advanced Encryption Standard (AES) in Cipher Block Chaining (CBC) mode). The resulting enciphered blocks are binary data that does not, in general look like Unicode text. Transcoder 206 is configured to transcode the enciphered blocks back into a Unicode-compatible format. The way to handle this data depends on the target UTF.

If the output target is UTF-16, the enciphered blocks can be broken into units of 15 bits each, which are then offset by 0x100, and treated as character code point scalar values. For the 128 bit block size from above, that is 9 characters per block (or, if the bits are packed so that a single character might span two blocks, 8.53 characters per block, on average).

If the target UTF is UTF-8, it would be most appropriate to restrict the output to the range U+0021-U+007E. This is 94 characters a 128 bit block would require 20 UTF-8 characters within this range to represent it. Alternately, the block could be base-64 encoded, using 22 characters per block. In another embodiment, The target client may restrict the appropriate range further. For example, to represent the data in a manner suitable for JavaScript, it would be appropriate to eliminate the quoting characters U+0022, U+10027, U+005C (double quote ("), single quote ('), and backslash (\), respectively). For a representation suitable for HTML and XML applications, the characters U+0026, U+003C and U+003E (ampersand (&), less than (<) and greater than (>), respectively) should be removed. For a representation that is suitable for JavaScript embedded in an HTML document, all six of these characters should be removed. This leads to base-91 or base-88 encodings, both of which would require 20 characters per 128 bit block to encode.

Figure 3:
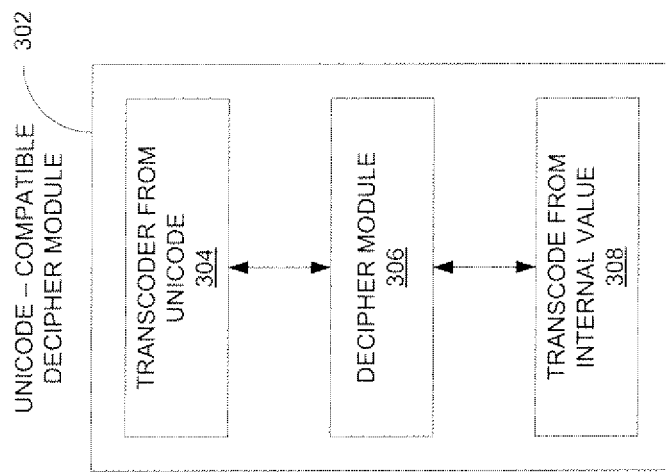
FIG. 3 is a block diagram illustrating one embodiment of a unicode-compatible decipherment module.

FIG. 3 is a block diagram illustrating one embodiment of a Unicode-compatible decipherment module 300 of a receiver. Deciphering and transcoding back to code point scalars is just the reverse of the steps from above. In one embodiment, Unicode-compatible decipherment module 300 includes a transcoder module 302, a decipher module 304, and a transcoder 306. Transcoder 302 is configured to transcode the Unicode-compatible format character data received from a sender to an intermediate value. Decipher module 304 deciphers the intermediate value. Transcoder 302 transcodes the intermediate value into Unicode character data.

FIGS. 1, 2 and 3 illustrates a diagrammatic representation of a machine in the exemplary form of a computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system of 102 and 104 includes a processing device, a main memory (e.g., read-only memory (ROM), flash memory, dynamic random access memory (DRAM) such as synchronous DRAM (SDRAM), a static memory (e.g. flash memory, static random access memory (SRAM), etc.), and a data storage device, which communicate with each other via a bus.

Processing device represents one or more general-purpose processing devices such as a microprocessor, central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device may also be one or more special-purpose processing devices such as an application specific integrated circuit (ASIC), a field programmable gate array (FPGA), a digital signal processor (DSP), network processor, or the like. The processing device is configured to execute the processing logic for performing the operations and steps discussed herein.

The computer system further include a network interface device.

The data storage device may include a machine-accessible storage medium on which is stored one or more sets of instructions (e.g., software) embodying any one or more of the methodologies or functions described herein. The software may also reside, completely or at least partially, within the main memory and/or within the processing device during execution thereof by the computer system, the main memory and the processing device also constituting machine-accessible storage media. The software may further be transmitted or received over a network via the network interface device.

Figure 4:
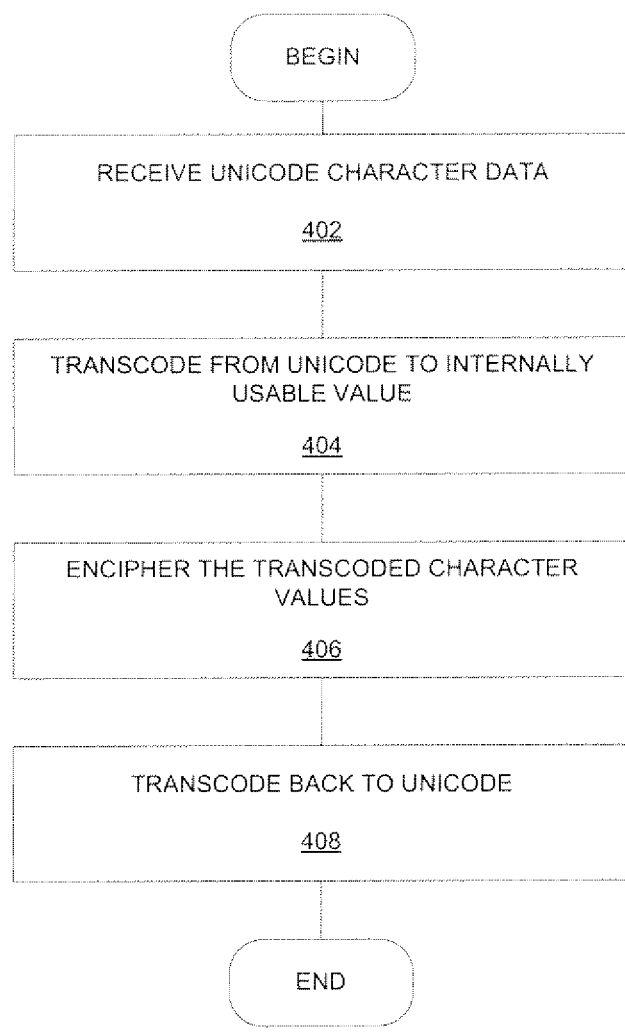
FIG. 4 is a flow diagram illustrating one embodiment of a method for enciphering unicode character data.

FIG. 4 is a flow diagram illustrating one embodiment of a method for enciphering unicode character data at a sender. At 402, Unicode character data is generated (and stored). At 404, the Unicode character data is transcoded to an intermediate value as previously described. At 406, the intermediate value is enciphered. At 408, the enciphered intermediate value is transcoded back to Unicode-compatible form.

Figure 5:
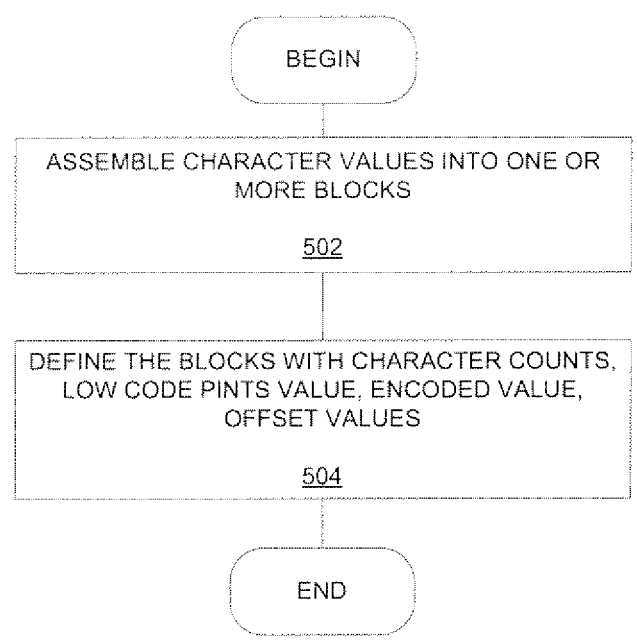
FIG. 5 is a flow diagram illustrating one embodiment of a method for transcoding Unicode character data into an intermediate value.

FIG. 5 is a flow diagram illustrating one embodiment of a method for transcoding Unicode character data into an operable intermediate value. At 502, several character values are assembled into one or more blocks and represented in a compact fashion. At 504, the blocks are defined using a count of characters, a low code point value, an encoded value to represent the range, and then a series of offset values from the low code point value. The encoding process attempts to pack as many characters as possible into one or a few blocks.

While the computer-accessible storage medium is shown in an exemplary embodiment to be a single medium, the term "computer-accessible storage medium" should be taken to include a single medium or multiple media (e.g., a centralized or distributed database, and/or associated caches and servers) that store the one or more sets of instructions. The term "computer-accessible storage medium" shall also be taken to include any medium that is capable of storing, encoding or carrying a set of instructions for execution by the machine and that cause the machine to perform any one or more of the methodologies of the present invention. The term "computer-accessible storage medium" shall accordingly be taken to include, but not be limited to, solid-state memories, optical and magnetic media.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   receiving, by a processing device, first character data in a first format for transcoding;
   transcoding, by the processing device, the first character data to an intermediate value;
   enciphering, by the processing device, the intermediate value to yield an enciphered intermediate value; and
   transcoding, by the processing device, the enciphered intermediate value to second character data encoded in a second format that is different from the first format.

2. The method of claim 1, wherein transcoding further comprises:
   assembling character values from the first character data into one or more blocks to yield assembled character values; and
   representing the assembled character values in a compact form.

3. The method of claim 2, wherein the compact form comprises:
   a count of characters;
   a low code point value;
   an encoded value to represent a range; and
   a series of offset values from the low code point value.

4. The method of claim 1, wherein transcoding further comprises:
   coding a delimiter at an end of the first character data, wherein the delimiter comprises an offset value with all bits set.

5. The method of claim 1, wherein enciphering further comprises enciphering using a block cipher with a block cipher mode, wherein the block cipher operates according to one of:
   Advanced Encryption Standard (AES);
   International Data Encryption Algorithm (IDEA);
   Data Encryption Standard (DES);
   Data Encryption Standard in encipher-decipher-encipher mode with three independent keys (3DES);
   a Blowfish encipherment algorithm;
   a Serpent encipherment algorithm; or a Twofish encipherment algorithm.

6. The method of claim 5, wherein a mode of operation of the block cipher comprises one or more of:
an Electronic Code Book (ECB) mode;
a Ciphertext Block Chaining (CBC) mode;
a Plaintext Block Chaining (PBC) mode;
a Propagating Cipher Block Chaining (PCBC) mode;
a Ciphertext Feedback (CFB) mode;
an Output Feedback (OFB) mode; or
a Counter (CTR) mode.

7. The method of claim 1, further comprising:
transcoding the enciphered intermediate value based on a target Unicode transformation format;
receiving the first character data;
transcoding the first character data to the enciphered intermediate value;
deciphering the intermediate value; and
transcoding the intermediate value to the second character data.

8. A non-transitory computer-readable storage medium, having instructions stored therein, which when executed by a processing device, cause the processing device to perform operations comprising:
receiving, by the processing device, first character data in a first format for transcoding;
transcoding, by the processing device, the first character data to an intermediate value;
enciphering, by the processing device, the intermediate value to yield an enciphered intermediate value; and
transcoding, by the processing device, the enciphered intermediate value to second character data encoded in a second format that is different from the first format.

9. The non-transitory computer-readable storage medium of claim 8, wherein transcoding further comprises:
assembling character values from the first character data into one or more blocks to yield assembled character values; and
representing the assembled character values in a compact form.

10. The non-transitory computer-readable storage medium of claim 9, wherein the compact form comprises:
a count of characters;
a low code point value;
an encoded value to represent a range; and
a series of offset values from the low code point value.

11. The non-transitory computer-readable storage medium of claim 7, wherein transcoding further comprises:
coding a delimiter at an end of the first character data, wherein the delimiter comprises an offset value with all bits set.

12. The non-transitory computer-readable storage medium of claim 7, wherein enciphering further comprises:
enciphering using a block cipher with a block cipher mode, wherein the block cipher operates according to one of:
Advanced Encryption Standard (AES);
International Data Encryption Algorithm (IDEA);
Data Encryption Standard (DES);
Data Encryption Standard in encipher-decipher-encipher mode with three independent keys (3DES);
a Blowfish encipherment algorithm;
a Serpent encipherment algorithm; or
a Twofish encipherment algorithm.

13. The non-transitory computer-readable storage medium of claim 12, wherein a mode of operation of the block cipher comprises one or more of:
an Electronic Code Book (ECB) mode;
a Ciphertext Block Chaining (CBC) mode;
a Plaintext Block Chaining (PBC) mode;
a Propagating Cipher Block Chaining (PCBC) mode;
a Ciphertext Feedback (CFB) mode;
an Output Feedback (OFB) mode; or
a Counter (CTR) mode.

14. The non-transitory computer-readable storage medium of claim 12, wherein the operations further comprises:
transcoding the enciphered intermediate value based on a target Unicode transformation format;
receiving the first character data;
transcoding the first character data to the enciphered intermediate value;
deciphering the intermediate value; and
transcoding the intermediate value to the second character data.

15. A system comprising:
a memory; and
a processing device coupled to the memory, wherein the processing device is configured to receive first character data in a first format for transcoding, to transcode the first character data to an intermediate value, to encipher the intermediate value to yield an enciphered intermediate value, and to transcode the enciphered intermediate value to second character data encoded in a second format that is different from the first format.

16. The system of claim 15, wherein the processing device is further configured to assemble character values from the first character data into one or more blocks to yield assembled character values, and to represent the assembled character values in a compact form.

17. The system of claim 16, wherein the compact form comprises:
a count of characters;
a low code point value;
an encoded value to represent a range; and
a series of offset values from the low code point value.

18. The system of claim 15, wherein the processing device is further configured to code a delimiter at an end of the first character data, wherein the delimiter comprises an offset value with all bits set.

19. The system of claim 15, wherein the processing device is further configured to encipher using a block cipher with a block cipher mode, wherein the block cipher operates according to one of:
Advanced Encryption Standard (AES);
International Data Encryption Algorithm (IDEA);
Data Encryption Standard (DES);
Data Encryption Standard in encipher-decipher-encipher mode with three independent keys (3DES);
a Blowfish encipherment algorithm;
a Serpent encipherment algorithm; or
a Twofish encipherment algorithm.

20. The system of claim 19, wherein a mode of operation of the block cipher comprises one or more of:
an Electronic Code Book (ECB) mode;
a Ciphertext Block Chaining (CBC) mode;
a Plaintext Block Chaining (PBC) mode;
a Propagating Cipher Block Chaining (PCBC) mode;
a Ciphertext Feedback (CFB) mode;
an Output Feedback (OFB) mode; or
a Counter (CTR) mode.

* * * * *